United States Patent
Han et al.

(10) Patent No.: US 12,175,719 B2
(45) Date of Patent: Dec. 24, 2024

(54) IMAGE PROCESSING METHOD, APPARATUS, AND ELECTRONIC DEVICE

(71) Applicant: Beijing Baidu Netcom Science and Technology Co., Ltd., Beijing (CN)

(72) Inventors: Fengze Han, Beijing (CN); Pengbin Yang, Beijing (CN); Caimao Yuan, Beijing (CN); Yang Yang, Beijing (CN); Fei Ni, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 577 days.

(21) Appl. No.: 17/405,752

(22) Filed: Aug. 18, 2021

(65) Prior Publication Data
US 2021/0374436 A1   Dec. 2, 2021

(30) Foreign Application Priority Data

Nov. 10, 2020   (CN) .......................... 202011244223.4

(51) Int. Cl.
*G06V 10/25*   (2022.01)
*G06V 20/56*   (2022.01)

(52) U.S. Cl.
CPC ............ *G06V 10/25* (2022.01); *G06V 20/588* (2022.01)

(58) Field of Classification Search
CPC ........ G06V 10/25; G06V 20/588; G06T 5/40; G06T 5/70; G06T 7/0002; G06T 7/187;
(Continued)

(56) References Cited

U.S. PATENT DOCUMENTS 7,835,572 B2 * 11/2010 Ferman ................ G06V 40/193
                                                    382/163
10,911,691 B1 *  2/2021 Le ............................ G06T 5/002
(Continued)

FOREIGN PATENT DOCUMENTS

CN   103808265 A  *  5/2014
CN   104021566 A  *  9/2014
(Continued)

OTHER PUBLICATIONS

Hamuda, Esmael, Brian Mc Ginley, Martin Glavin, and Edward Jones. "Automatic crop detection under field conditions using the HSV colour space and morphological operations." Computers and electronics in agriculture 133 (2017): 97-107. (Year: 2017).*
Changhui, Yang, Hu Youcheng, Huang Lin, Liu Sa, and Liu Yanping. "Overlapped fruit recognition for citrus harvesting robot in natural scenes." In 2017 2nd International Conference on Robotics and Automation Engineering (ICRAE), pp. 398-402. IEEE, 2017. (Year: 2017).*
(Continued)

*Primary Examiner* — Carol Wang
(74) *Attorney, Agent, or Firm* — Maginot, Moore & Beck LLP

(57) ABSTRACT

An image processing method, apparatus, and electronic device relate to the technical field of image processing. In the method, an initial image is acquired; and then a connected region in the initial image is acquired, where the connected region is a region composed of pixels having pixel values within a target threshold range in the initial image. In addition, a region of interest in the initial image is acquired according to the connected region, and the region of interest is preprocessed to obtain a target image. By extracting the region of interest in the initial image, and only preprocessing the region of interest, the resource expenditure during image preprocessing can be reduced, and the preprocessing efficiency can be improved.

13 Claims, 4 Drawing Sheets

(58) Field of Classification Search
CPC . G06T 2207/10004; G06T 2207/20028; G06T 2207/20104; G06T 2207/30256
See application file for complete search history.

(56) References Cited

U.S. PATENT DOCUMENTS

| | | | | |
|---|---|---|---|---|
| 2008/0170772 | A1* | 7/2008 | Lindberg | G01N 15/1463 382/133 |
| 2009/0290776 | A1* | 11/2009 | Sun | A61B 5/055 382/128 |
| 2011/0013232 | A1* | 1/2011 | Ashikaga | H04N 1/00063 358/452 |
| 2022/0309639 | A1* | 9/2022 | Liu | G06V 10/54 |
| 2023/0177698 | A1* | 6/2023 | Chen | G06T 7/187 382/128 |

FOREIGN PATENT DOCUMENTS

| | | | | |
|---|---|---|---|---|
| CN | 105718870 | A | * | 6/2016 |
| CN | 106022243 | A | * | 10/2016 ......... G06K 9/00798 |
| CN | 106529505 | A | * | 3/2017 ......... G06K 9/00798 |
| CN | 108052904 | A | | 5/2018 |
| CN | 108537142 | A | | 9/2018 |
| CN | 110705441 | A | * | 1/2020 ......... G06K 9/00818 |
| CN | 107729814 | B | | 6/2020 |
| JP | 2004152048 | A | * | 5/2004 |

OTHER PUBLICATIONS

Thakur, Niharika, and Mamta Juneja. "Pre-processing of retinal images for removal of outliers." Wireless Personal Communications 116 (2021): 739-765. (Year: 2021).*
Yao, Yi-yong, and Yu-tao Hu. "Recognition and location of solar panels based on machine vision." In 2017 2nd Asia-Pacific Conference on Intelligent Robot Systems (ACIRS), pp. 7-12. IEEE, 2017. (Year: 2017).*
Li, Y. H., L. Tian, T. H. Li, Y. Q. Wu, Z. R. Niu, and J. L. Hou. "Recognition of garlic clove orientation based on machine vision." In Journal of Physics: Conference Series, vol. 1550, No. 3, p. 032009. IOP Publishing, 2020. (Year: 2020).*
CN105718870 translation (Year: 2016).*
CN106022243 translation (Year: 2016).*
Nan, Zhixiong, Ping Wei, Linhai Xu, and Nanning Zheng. "Efficient lane boundary detection with spatial-temporal knowledge filtering." Sensors 16, No. 8 (2016): 1276. (Year: 2016).*
Yu, Guizhen, Zhangyu Wang, Xinkai Wu, Yalong Ma, and Yunpeng Wang. "Efficient lane detection using deep lane feature extraction method." SAE International Journal of Passenger Cars-Electronic and Electrical Systems 11, No. 07-11-01-0006 (2017): 57-66. (Year: 2017).*
English Machine Translation of CN107729814B. (22 Pages).
English Machine Translation of CN108052904A. (26 Pages).
English Machine Translation of CN108537142A. (10 Pages).

* cited by examiner

IMAGE PROCESSING METHOD, APPARATUS, AND ELECTRONIC DEVICE

CROSS-REFERENCE TO RELATED APPLICATION

The present application claims priority to Chinese patent application No. 202011244223.4 filed in China on Nov. 10, 2020, the disclosure of which is incorporated herein by reference in its entirety.

TECHNICAL FIELD

The present disclosure relates to the technical field of image processing in the computer field. Specifically, an image processing method, apparatus, and electronic device are provided.

BACKGROUND

Lane line detection is an important foundation in the field of autonomous driving, and is widely used in systems and modules such as lane keeping, adaptive cruise, and within-lane positioning. Highway pavement is generally made of asphalt, and its uneven surface will cause a lot of noise in imaging. At the same time, the vehicle body's occlusion of light will produce dark areas (shadows) on the ground, and the changes of lighting or shading on the ground will form false edges, which will interfere with the detection effect of lane lines.

SUMMARY

The present disclosure provides an image processing method, apparatus, and electronic device.

A first aspect of the present disclosure provides an image processing method, including acquiring an initial image, and acquiring a connected region in the initial image, where the connected region is a region composed of pixels having pixel values within a target threshold range in the initial image. The method also includes acquiring a region of interest in the initial image according to the connected region and preprocessing the region of interest to obtain a target image.

A second aspect of the present disclosure provides an image processing apparatus, including acquiring modules. The first acquiring module is configured to acquire an initial image. The second acquiring module is configured to acquire a connected region in the initial image, where the connected region is a region composed of pixels having pixel values within a target threshold range in the initial image. The third acquiring module is configured to acquire a region of interest in the initial image according to the connected region. The fourth acquiring module is configured to preprocess the region of interest to obtain a target image.

A third aspect of the present disclosure provides an image processing electronic device, including at least one processor and a memory communicatively connected to the at least one processor. The memory stores instructions executable by the at least one processor to enable the at least one processor to implement the method provided by the first aspect.

A fourth aspect of the present disclosure provides a non-transitory computer-readable storage medium storing computer instructions for causing the computer to perform the method provided by any one of the embodiments of the first aspect.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The accompanying drawings are used to better understand the solution, and do not constitute a limitation to the present disclosure. Among them.

DETAILED DESCRIPTION

The following describes exemplary embodiments of the present disclosure with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

Figure 1:
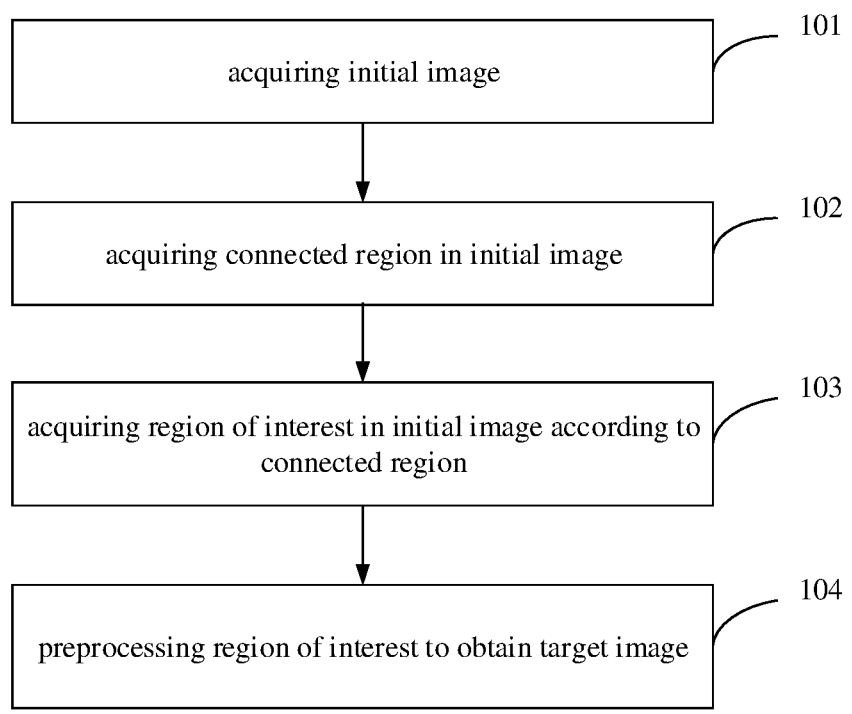
FIG. 1 is a flowchart of an image processing method according to an embodiment of the present disclosure.

Referring to FIG. 1, FIG. 1 is a flowchart of an image processing method according to an embodiment of the present disclosure; as shown in FIG. 1, the present embodiment provides an image processing method, including the following steps:

Step 101: acquiring an initial image.

The initial image may be collected by a camera, for example, the initial image may be obtained by real-time collection of a camera installed on a vehicle. The initial image may be an RGB image (where R represents red, G represents green, and B represents blue).

Step 102: acquiring a connected region in the initial image, where the connected region is a region composed of pixels having pixel values within a target threshold range in the initial image.

The target threshold range may be determined according to a pixel value of a target object. For example, in a case that the target object is a white lane line and/or a yellow lane line, the target threshold range may be a pixel value range of the white lane line or the yellow lane line. In this step, the pixels having pixel values in the target threshold range in the initial image are determined, and then the connected region composed of these pixels is obtained. The connected region may be one region or multiple regions, which is specifically determined according to positional relationship between these pixels. In a case that two pixels having pixel values in the target threshold range in the initial image are adjacent, the two pixels may be regarded as connected, and the two pixels are located in the same connected region.

Step 103: acquiring a region of interest in the initial image according to the connected region.

The region of interest is determined from the connected region. For example, in a case that the connected region has only one region, then this region is the region of interest; in a case that the connected region has multiple regions, a region with a largest area among the multiple regions may be considered as the region of interest. The region of interest may be the region where the target object is located.

Step 104: preprocessing the region of interest to obtain a target image.

The preprocessing may be one or more of histogram equalization processing, bilateral filtering, gamma correction, and morphological filtering. Preprocessing the region of interest can improve the image quality of the obtained target image and facilitate further identifying whether there is a target object in the target image, for example, identifying whether the target image includes a lane line.

Preprocessing the region of interest instead of preprocessing the entire initial image can reduce the resource expenditure during preprocessing and improve the efficiency of preprocessing at the same time.

In the present embodiment, an initial image is acquired; and then a connected region in the initial image is acquired, where the connected region is a region composed of pixels having pixel values within a target threshold range in the initial image; then a region of interest in the initial image is acquired according to the connected region; and the region of interest is preprocessed to obtain a target image. By extracting the region of interest in the initial image, and only preprocessing the region of interest, the resource expenditure during image preprocessing can be reduced, and the preprocessing efficiency can be improved.

In an embodiment of the present application, acquiring a connected region in the initial image includes converting the pixel value of the pixel in the initial image to a hue saturation value (HSV) color space to obtain a pixel value in the HSV color space of the pixel, and acquiring, according to the pixel value in the HSV color space of the pixel in the initial image, a connected region, where the connected region is composed of pixels having pixel values in the HSV color space within the target threshold range in the initial image.

In the above, the pixel value of the pixel in the initial image is converted to the HSV color space, where HSV is Hue, Saturation, and Value, and the pixel value in the HSV color space of the pixel is obtained. The HSV color space has better continuity, and performing threshold extraction according to the pixel value of the HSV color space is more convenient to select pixels.

After converting the pixel value of the pixel in the initial image to the HSV color space, the pixel value of the HSV color space is used to select the pixel in the initial image.

The target threshold range may be determined according to the pixel value of the target object. For example, in a case that the target object is a white lane line and/or a yellow lane line, the target threshold range may be a pixel value range of the white lane line or the yellow lane line. In this step, the pixels having pixel values of the HSV color space in the target threshold range in the initial image are determined, and then the connected region composed of these pixels is obtained. The connected region may be one region or multiple regions, which is specifically determined according to positional relationship between these pixels. In a case that two pixels having pixel values of the HSV color space within the target threshold range in the initial image are adjacent, the two pixels may be regarded as connected, and the two pixels are located in the same connected region.

In the present embodiment, the pixel value of the pixel in the initial image is converted to the HSV color space, the pixel value in the HSV color space of the pixel is obtained, and then the pixel value in the HSV color space of the pixel in the initial image is used to obtain the connected region in the initial image. The HSV color space has better continuity, and performing threshold extraction according to the pixel value of the HSV color space is more convenient to select pixels, and the accuracy of the obtained connected region is higher.

In an embodiment of the present application, acquiring a region of interest in the initial image according to the connected region includes: determining a target region according to the connected region, where the target region is a region with the largest area in the connected region; acquiring a smallest circumscribed rectangular region of the target region in the initial image; and intercepting the initial image according to the smallest circumscribed rectangular region to obtain the region of interest.

In the above, in a case that the connected region has only one region, then this region is the target region; in a case that the connected region has multiple regions, the region with the largest area among the multiple regions can be considered as the target region, and the target region may be a region where the target object is located. Since the shape of the target region may be irregular, in order to facilitate the interception of the target region, the smallest circumscribed rectangular region of the target region can be obtained, and the initial image can be intercepted according to the smallest circumscribed rectangular region to obtain the region of interest. The region of interest is a sub-image obtained by intercepting the smallest circumscribed rectangular region in the initial image, and the sub-image includes the target region in the initial image.

In the present embodiment, when acquiring the region of interest in the initial image according to the connected region, a target region is determined according to the connected region, and the target region is the region with the largest area in the connected region; the smallest circumscribed rectangular region of the target region in the initial image is acquired; and the initial image is intercepted according to the smallest circumscribed rectangular region to obtain the region of interest. By intercepting the smallest circumscribed rectangular region where the target region is located, a region of interest including the target region can be obtained, which facilitates subsequent preprocessing for the region of interest, thereby reducing resource expenditure during image preprocessing, and improving preprocessing efficiency.

In the above, intercepting the initial image according to the smallest circumscribed rectangular region to obtain the region of interest includes determining an interception region according to a center point of the smallest circumscribed rectangular region, the interception region including the smallest circumscribed rectangular region, and intercepting the interception region in the initial image to obtain the region of interest.

In this embodiment, in order to avoid missing a lane line region due to missed detection, the interception region may be further determined based on the center point of the smallest circumscribed rectangular region. For example, the center point is calculated according to the diagonal position of the smallest circumscribed rectangular region, and the interception region is determined based on the center point and the preset size. The preset size here may be set according to the actual situation, and it is not limited here, and the preset size may be slightly larger than the size of the smallest circumscribed rectangular region. The interception region includes the smallest circumscribed rectangular region.

In the present embodiment, the interception region is determined according to a center point of the smallest circumscribed rectangular region, the interception region including the smallest circumscribed rectangular region; the interception region in the initial image is intercepted to obtain the region of interest, missing the lane line region due to missed detection can be avoided.

After the region of interest is acquired, preprocessing the region of interest, specifically, preprocessing the region of interest to obtain the target image includes: acquiring a single-channel image of the region of interest; performing histogram equalization processing on the single-channel image to obtain a first intermediate image; performing bilateral filtering on the first intermediate image to obtain a second intermediate image; performing gamma correction on the second intermediate image to obtain a third intermediate image; and performing morphological filtering on the third intermediate image to obtain the target image.

In the above, the region of interest is a sub-image obtained by intercepting the initial image, and the sub-image includes the target region in the initial image. In a case that the sub-image is a multi-channel image, then a single-channel image of the sub-image is acquired. For example, in a case that the sub-image is an RGB image, then an R-channel image is acquired, or a G-channel image or a B-channel image may also be acquired.

Figure 2:
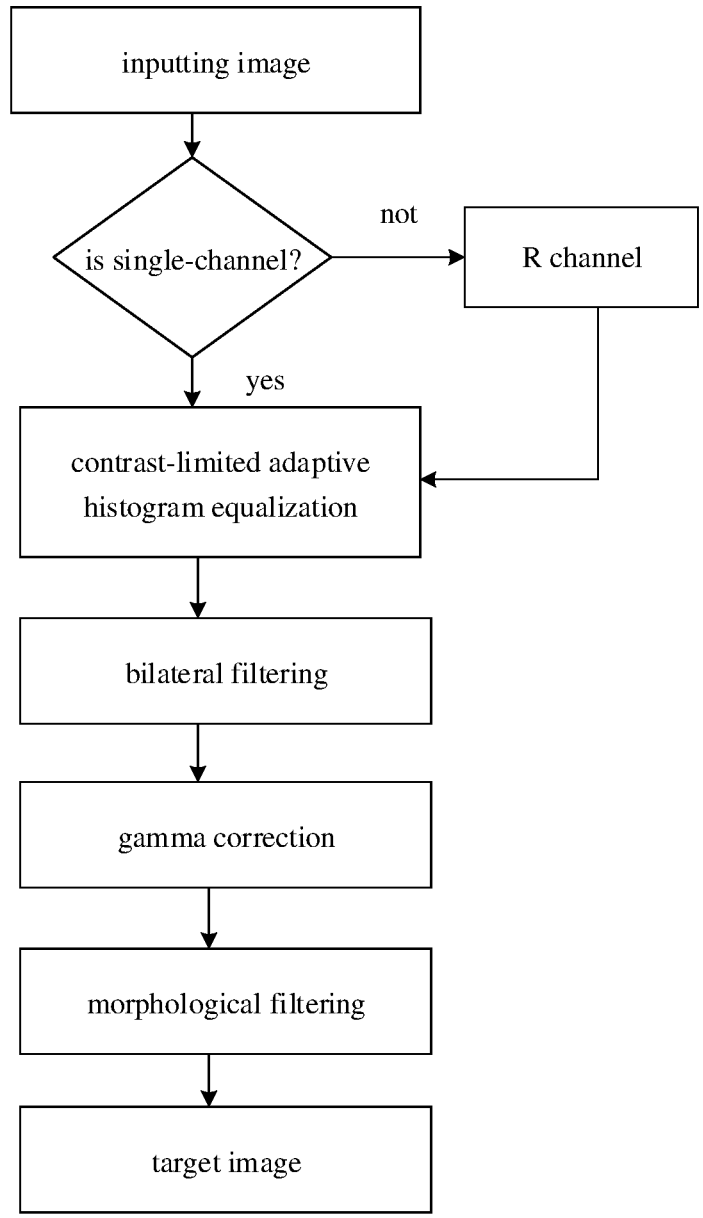
FIG. 2 is a flowchart of preprocessing according to an embodiment of the present disclosure.

As shown in FIG. 2, when processing the region of interest, whether the region of interest is a single-channel image may be determined first, if not, a single-channel image of the region of interest is acquired first, and then a histogram equalization processing is performed on the single-channel image to obtain a first intermediate image; bilateral filtering is performed on the first intermediate image to obtain a second intermediate image; gamma correction is performed on the second intermediate image to obtain a third intermediate image; morphological filtering is performed on the third intermediate image to obtain the target image.

Since the initial image may have problems of overexposure or underexposure when shooting, the region of interest may also have problems of overexposure or underexposure. The histogram equalization can specifically use the contrast-limited adaptive histogram equalization. Using contrast-limited adaptive histogram equalization to process the region of interest can readjust brightness distribution of pixels in the region of interest. The adjusted histogram has the largest dynamic range and the contrast of the region of interest may be improved For the salt and pepper noise generated in the image due to uneven asphalt pavement, bilateral filtering can suppress the noise in the first intermediate image while protecting the edge characteristics of the first intermediate image to facilitate subsequent edge extraction. Gamma correction is to suppress the dark areas (shadows) in the second intermediate image by adjusting the gamma value and reduce the false edges in the second intermediate image. Finally, through morphological filtering, a hole in the lane line region in the third intermediate image due to fading and paint chipping is filled, so that the lane line region is more homogeneous and uniform, which is convenient for subsequent identification of the lane line in the target image, and improves the recognition accuracy.

In the above, after the region of interest is acquired, the region of interest is preprocessed, that is, histogram equalization processing, bilateral filtering, gamma correction, and morphological filtering are performed in sequence to improve the contrast of the region of interest and remove the salt and pepper noise of the region of interest, reduce false edges, fill the hole in the lane line region, thereby improving the quality of the target image, and facilitating subsequent recognition of the lane line in the target image, and improving the recognition accuracy.

Figure 3:
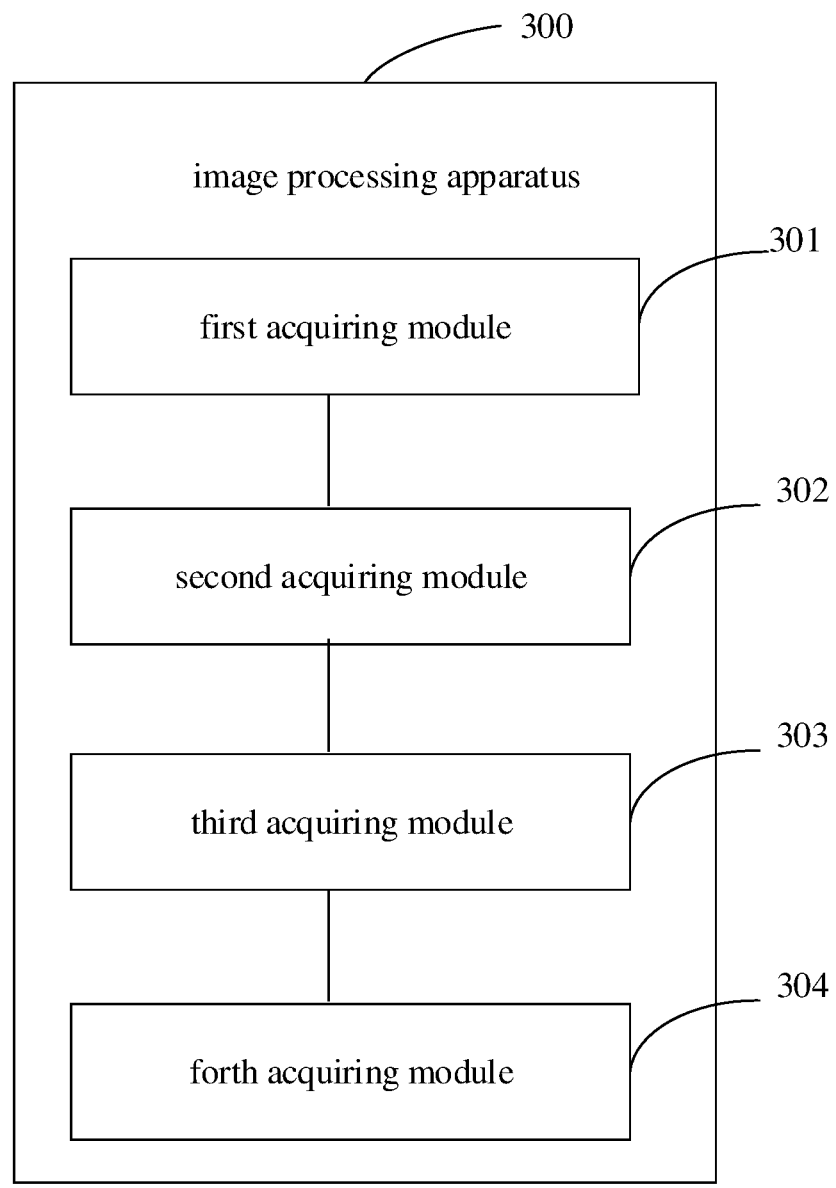
FIG. 3 is a structural diagram of an image processing apparatus according to an embodiment of the present disclosure.

Referring to FIG. 3, FIG. 3 is a flowchart of an image processing apparatus according to an embodiment of the present disclosure; as shown in FIG. 3, the present embodiment provides an image processing apparatus 300, includes acquiring modules 301-304. The first acquiring module 301 is configured to acquire an initial image. The second acquiring module 302 is configured to acquire a connected region in the initial image, where the connected region is a region composed of pixels having pixel values within a target threshold range in the initial image. The third acquiring module 303 is configured to acquire a region of interest in the initial image according to the connected region. Thea fourth acquiring module 304 is configured to preprocess the region of interest to obtain a target image.

In an embodiment of the present application, the second acquiring module 302 includes a converting sub-module configured to convert the pixel value of the pixel in the initial image to a hue saturation value (HSV) color space to obtain a pixel value in the HSV color space of the pixel, and a first acquiring sub-module configured to acquire, according to the pixel value in the HSV color space of the pixel in the initial image, a connected region in the initial image, where the connected region is composed of pixels having pixel values in the HSV color space within the target threshold range in the initial image.

In an embodiment of the present application, the third acquiring module 303, includes: a second acquiring sub-module configured to determine a target region according to the connected region, where the target region is a region with the largest area in the connected region; a third acquiring sub-module configured to acquire a smallest circumscribed rectangular region of the target region in the initial image; and an intercepting sub-module configured to intercept the initial image according to the smallest circumscribed rectangular region to obtain the region of interest.

In an embodiment of the present application, the intercepting sub-module, includes a determining unit configured to determine an interception region according to a center point of the smallest circumscribed rectangular region, the interception region includes the smallest circumscribed rectangular region, and an intercepting unit configured to intercept the interception region in the initial image to obtain the region of interest.

In an embodiment of the present application, the fourth acquiring module 304, includes acquiring sub-modules. The fourth acquiring sub-module is configured to acquire a single-channel image of the region of interest. The fifth acquiring sub-module is configured to perform histogram equalization processing on the single-channel image to obtain a first intermediate image. The sixth acquiring sub-module is configured to perform bilateral filtering on the first intermediate image to obtain a second intermediate image. The seventh acquiring sub-module is configured to perform gamma correction on the second intermediate image to obtain a third intermediate image. The eighth acquiring sub-module is configured to perform morphological filtering on the third intermediate image to obtain the target image.

In the image processing apparatus 300 of the present embodiment, an initial image is acquired; and then a connected region in the initial image is acquired, where the connected region is a region composed of pixels having pixel values within a target threshold range in the initial image; then a region of interest in the initial image is acquired according to the connected region; and the region of interest is preprocessed to obtain a target image. By extracting the region of interest in the initial image, and only preprocessing the region of interest, the resource expenditure during image preprocessing can be reduced, and the preprocessing efficiency can be improved.

According to the embodiments of the present disclosure, an electronic device and a readable storage medium are further provided.

Figure 4:
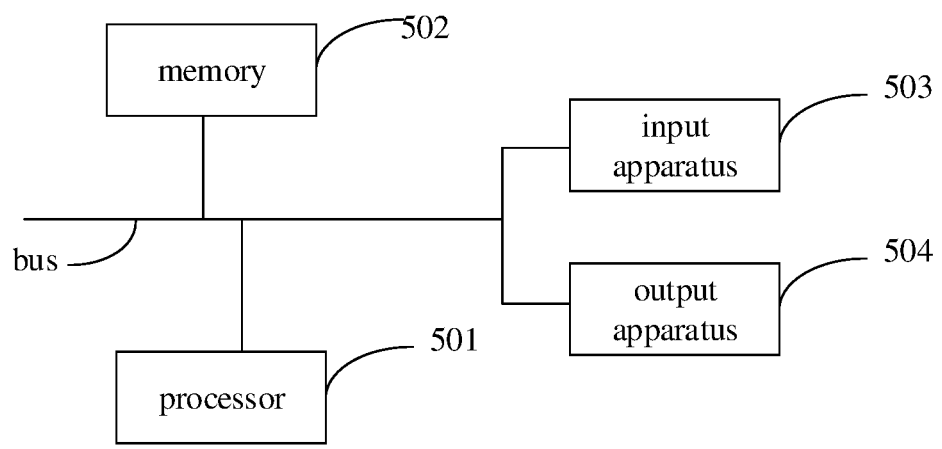
FIG. 4 is a block diagram of an electronic device configured to implement the image processing method according to an embodiment of the present disclosure.

As shown in FIG. 4, it is a block diagram of an electronic device configured to implement the image processing method according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital processing, cellular phones, intelligent phones, wearable devices, and other similar computing devices. The components shown here, their connections and relationships, and their functions are merely for illustration, and are not intended to be limiting implementations of the disclosure described and/or required herein.

As shown in FIG. 4, the electronic device includes: one or more processors 501, a memory 502, and interfaces for connecting various components, including a high-speed interface and a low-speed interface. The various components are interconnected using different buses and may be mounted on a common motherboard or otherwise installed as required. The processor may process instructions executed within the electronic device, wherein the instructions executed within the electronic device includes those instructions stored in or on a memory for displaying graphic information of a graphical user interface (GUI) on an external input/output device, such as a display device coupled to the interface. In other implementations, multiple processors and/or multiple buses may be used with multiple memories and multiple storages, if desired. Similarly, multiple electronic devices may be connected, each providing some necessary operations (for example, as a server array, a group of blade servers, or a multiprocessor system). One processor 501 is shown as an example in FIG. 4.

The memory 502 is a non-transitory computer-readable storage medium provided by the present disclosure. The memory stores instructions executable by at least one processor, so that the at least one processor executes the image processing method provided in the present disclosure. The non-transitory computer-readable storage medium of the present disclosure stores computer instructions, which are used to cause a computer to execute the image processing method provided by the present disclosure.

As a non-transitory computer-readable storage medium, the memory 502 may be used to store non-transitory software programs, non-transitory computer executable programs, and modules, such as a program instruction/module/unit (for example, the first acquiring module 301, second acquiring module 302, third acquiring module 303, and fourth acquiring module 304 shown in FIG. 3) corresponding to the image processing method in embodiments of the present disclosure. The processor 501 executes various functional applications and data processing of the server by running non-transitory software programs, instructions, and modules stored in the memory 502, that is, the image processing method in embodiments of the foregoing method is implemented.

The memory 502 may include a program storage partition and a data storage partition, where the program storage partition may store an operating system and an application program required for at least one function, and the data storage partition may store data created for use by the electronic device according to the image processing method. In addition, the memory 502 may include a high-speed random-access memory, and may also include a non-transitory memory, such as at least one magnetic disk storage device, a flash memory device, or other non-transitory solid-state storage device. In some embodiments, the memory 502 may optionally include a memory remotely disposed with respect to the processor 501, and the remote memory may be connected through a network to the electronic device of the image processing method. Examples of the above network include, but are not limited to, the Internet, an Intranet, a local area network, a mobile communication network and combinations thereof.

The electronic device of the image processing method may further include an input apparatus 503 and an output apparatus 504. The processor 501, the memory 502, the input apparatus 503, and the output apparatus 504 may be connected via a bus or other means. FIG. 4 has illustrated a connection via a bus as an example.

The input apparatus 503 can receive inputted numeric or character information, and generate a key signal input related to a user setting and function control of an electronic device for image processing, such as a touch screen, a keypad, a mouse, a trackpad, a touchpad, a pointing stick, one or more mouse buttons, a trackball, a joystick or the like. The output apparatus 504 may include a display device, an auxiliary lighting apparatus (e.g., an LED), a haptic feedback apparatus (e.g., a vibration motor) and the like. The display device may include, but is not limited to, a liquid crystal display (LCD), a light emitting diode (LED) display, and a plasma display. In some embodiments, the display device may be a touch screen.

Various implementations of the systems and technologies described herein may be implemented in a digital electronic circuitry, an integrated circuit system, an application-specific integrated circuit (ASIC), computer hardware, firmware, software, and/or combinations thereof. These various embodiments may include: implementations in one or more computer programs, which can be executed by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

These computing programs (also known as programs, software, software applications or codes) include machine instructions of a programmable processor, and can be implemented using high-level procedures and/or object-oriented programming languages, and/or assembly/machine languages. As used herein, the terms "machine-readable medium" and "computer-readable medium" both refer to any computer program product, apparatus, and/or apparatus (e.g., a magnetic disk, an optical disk, a memory, a programmable logic device (PLD)) used to provide the machine instructions and/or data to a programmable processor, including machine-readable media that receive machine instructions as machine-readable signals. The term "machine-readable signal" refers to any signal used to provide machine instructions and/or data to a programmable processor.

To provide interaction with the user, the systems and technologies described herein can be implemented on a computer that has: a display device (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of apparatuses may also be used to provide interaction with the user. For example, the feedback provided to the user may be any form of sensory feedback (e.g., a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN) and the Internet.

The computer system may include a client and a server. The client and server are typically remote from each other and interact via a communication network. The client-server relationship is created by computer programs running on respective computers and having a client-server relationship with each other.

In the present disclosure, an initial image is acquired; and then a connected region in the initial image is acquired, where the connected region is a region composed of pixels having pixel values within a target threshold range in the initial image; then a region of interest in the initial image is acquired according to the connected region; and the region of interest is preprocessed to obtain a target image. By extracting the region of interest in the initial image, and only preprocessing the region of interest, the resource expenditure during image preprocessing can be reduced, and the preprocessing efficiency can be improved.

The pixel value of the pixel in the initial image is converted to the HSV color space, the pixel value in the HSV color space of the pixel is obtained, and then the pixel value in the HSV color space of the pixel in the initial image is used to obtain the connected region in the initial image. The HSV color space has better continuity, and performing threshold extraction according to the pixel value of the HSV color space is more convenient to select pixels, and the accuracy of the obtained connected region is higher.

When acquiring the region of interest in the initial image according to the connected region, a target region is determined according to the connected region, and the target region is the region with the largest area in the connected region; the smallest circumscribed rectangular region of the target region in the initial image is acquired; and the initial image is intercepted according to the smallest circumscribed rectangular region to obtain the region of interest. By intercepting the smallest circumscribed rectangular region where the target region is located, a region of interest including the target region can be obtained, which facilitates subsequent preprocessing for the region of interest, thereby reducing resource expenditure during image preprocessing, and improving preprocessing efficiency.

The interception region is determined according to a center point of the smallest circumscribed rectangular region, the interception region includes the smallest circumscribed rectangular region; the interception region in the initial image is intercepted to obtain the region of interest, so that missing the lane line region due to missed detection can be avoided.

After the region of interest is acquired, the region of interest is preprocessed, that is, histogram equalization processing, bilateral filtering, gamma correction, and morphological filtering are performed in sequence to improve the contrast of the region of interest, remove the salt and pepper noise of the region of interest, reduce false edges, fill the hole in the lane line area, thereby improving the quality of the target image, facilitating subsequent recognition of the lane line in the target image, and improving the recognition accuracy.

It should be understood that the various forms of processes shown above may be used, and steps may be reordered, added or removed. For example, various steps described in the present disclosure can be executed in parallel, in sequence, or in alternative orders. As long as the desired results of the technical solutions disclosed in the present disclosure can be achieved, no limitation is imposed herein.

The foregoing specific implementations do not constitute any limitation on the protection scope of the present disclosure. It should be understood by those skilled in the art that various modifications, combinations, sub-combinations and substitutions may be made as needed by design requirements and other factors. Any and all modification, equivalent substitution, improvement or the like within the spirit and concept of the present disclosure shall fall within the protection scope of the present disclosure.

What is claimed is:

1. An image processing method for lane line detection, comprising:
    acquiring an initial image by a camera installed on a vehicle;
    acquiring a connected region in the initial image, wherein the connected region is a region composed of pixels having pixel values within a target threshold range in the initial image;
    acquiring a region of interest in the initial image according to the connected region; and
    preprocessing the region of interest to obtain a target image;
    wherein preprocessing the region of interest to obtain the target image comprises:
    acquiring a single-channel image of the region of interest;
    performing histogram equalization processing on the single-channel image to obtain a first intermediate image;
    performing bilateral filtering on the first intermediate image to obtain a second intermediate image;
    performing gamma correction on the second intermediate image to obtain a third intermediate image; and
    performing morphological filtering on the third intermediate image to obtain the target image.

2. The method according to claim 1, wherein acquiring the connected region in the initial image comprises:
    converting a pixel value of a pixel in the initial image to a hue saturation value (HSV) color space to obtain a pixel value in the HSV color space of the pixel;

acquiring, according to the pixel value in the HSV color space of the pixel in the initial image, a connected region, wherein the connected region is composed of pixels having pixel values in the HSV color space within the target threshold range in the initial image.

3. The method according to claim 1, wherein acquiring the region of interest in the initial image according to the connected region comprises:
   determining a target region according to the connected region, wherein the target region is a region with a largest area in the connected region;
   acquiring a smallest circumscribed rectangular region of the target region in the initial image; and
   extracting the initial image according to the smallest circumscribed rectangular region to obtain the region of interest.

4. The method according to claim 3, wherein extracting the initial image according to the smallest circumscribed rectangular region to obtain the region of interest comprises:
   determining a to-be-extracted region according to a center point of the smallest circumscribed rectangular region, the to-be-extracted region including the smallest circumscribed rectangular region; and
   extracting the to-be-extracted region in the initial image to obtain the region of interest.

5. A non-transitory computer program product comprising a computer program, wherein, when the computer program is run by a processor, the processor implements the method according to claim 1.

6. An electronic device for lane line detection, comprising at least one processor; and
   a memory communicatively connected to the at least one processor wherein the memory stores instructions executable by the at least one processor to enable the at least one processor to implement:
   acquiring an initial image by a camera installed on a vehicle;
   acquiring a connected region in the initial image, wherein the connected region is a region composed of pixels having pixel values within a target threshold range in the initial image;
   acquiring a region of interest in the initial image according to the connected region; and
   preprocessing the region of interest to obtain a target image;
   wherein the at least one processor is configured to implement:
   acquiring a single-channel image of the region of interest;
   performing histogram equalization processing on the single-channel image to obtain a first intermediate image;
   performing bilateral filtering on the first intermediate image to obtain a second intermediate image;
   performing gamma correction on the second intermediate image to obtain a third intermediate image; and
   performing morphological filtering on the third intermediate image to obtain the target image.

7. The electronic device according to claim 6, wherein the at least one processor is configured to implement:
   converting a pixel value of a pixel in the initial image to a hue saturation value (HSV) color space to obtain a pixel value in the HSV color space of the pixel; and
   acquiring, according to the pixel value in the HSV color space of the pixel in the initial image, a connected region, wherein the connected region is composed of pixels having pixel values in the HSV color space within the target threshold range in the initial image.

8. The electronic device according to claim 6, wherein the at least one processor is configured to implement:
   determining a target region according to the connected region, wherein the target region is a region with a largest area in the connected region;
   acquiring a smallest circumscribed rectangular region of the target region in the initial image; and
   extracting the initial image according to the smallest circumscribed rectangular region to obtain the region of interest.

9. The electronic device according to claim 8, wherein the at least one processor is configured to implement:
   determining a to-be-extracted region according to a center point of the smallest circumscribed rectangular region, the to-be-extracted region including the smallest circumscribed rectangular region; and
   extracting the to-be-extracted region in the initial image to obtain the region of interest.

10. A non-transitory computer-readable storage medium storing computer instructions for causing the computer to perform:
    acquiring an initial image by a camera installed on a vehicle;
    acquiring a connected region in the initial image, wherein the connected region is a region composed of pixels having pixel values within a target threshold range in the initial image;
    acquiring a region of interest in the initial image according to the connected region; and
    preprocessing the region of interest to obtain a target image;
    wherein the computer instructions are configured to cause the computer to perform:
    acquiring a single-channel image of the region of interest;
    performing histogram equalization processing on the single-channel image to obtain a first intermediate image;
    performing bilateral filtering on the first intermediate image to obtain a second intermediate image;
    performing gamma correction on the second intermediate image to obtain a third intermediate image; and
    performing morphological filtering on the third intermediate image to obtain the target image.

11. The non-transitory computer-readable storage medium according to claim 10, wherein the computer instructions are configured to cause the computer to perform:
    converting a pixel value of a pixel in the initial image to a hue saturation value (HSV) color space to obtain a pixel value in the HSV color space of the pixel;
    acquiring, according to the pixel value in the HSV color space of the pixel in the initial image, a connected region, wherein the connected region is composed of pixels having pixel values in the HSV color space within the target threshold range in the initial image.

12. The non-transitory computer-readable storage medium according to claim 10, wherein the computer instructions are configured to cause the computer to perform:
    determining a target region according to the connected region, wherein the target region is a region with a largest area in the connected region;
    acquiring a smallest circumscribed rectangular region of the target region in the initial image; and
    extracting the initial image according to the smallest circumscribed rectangular region to obtain the region of interest.

13. The non-transitory computer-readable storage medium according to claim 12, wherein the computer instructions are configured to cause the computer to perform:

determining a to-be-extracted region according to a center point of the smallest circumscribed rectangular region, the to-be-extracted region including the smallest circumscribed rectangular region; and extracting the to-be-extracted region in the initial image to obtain the region of interest.

\* \* \* \* \*